United States Patent [19]

Gysi

[11] 4,042,357

[45] Aug. 16, 1977

[54] AIR FILTER UNIT FOR SLIDING SASH WINDOWS

[76] Inventor: Rose Eleanor Gysi, 637 Linden Ave., Victoria, British Columbia, Canada, V8V 4G6

[21] Appl. No.: 681,059

[22] Filed: Apr. 28, 1976

[51] Int. Cl.² .................................................. B01D 45/00
[52] U.S. Cl. ........................................... 55/417; 55/418; 55/481; 55/484; 55/496; 98/88 S
[58] Field of Search ............... 55/484, 417, 385 R, 55/496, 418, 501, 511, 481; 98/88 L, 88 S, 96-99.8

[56] References Cited

U.S. PATENT DOCUMENTS

| | | | |
|---|---|---|---|
| 1,916,907 | 7/1933 | Sargent | 55/482 |
| 2,291,383 | 7/1942 | Espenschied | 98/99.8 |
| 3,464,188 | 9/1969 | Keuls | 55/234 |
| 3,757,494 | 9/1973 | Keuls | 55/496 |

FOREIGN PATENT DOCUMENTS 929,092  6/1963  United Kingdom .................. 55/496

Primary Examiner—Bernard Nozick
Attorney, Agent, or Firm—Larson, Taylor and Hinds

[57] ABSTRACT

A filter unit having a central member of substantially rectangle cross section and made up of one or more interconnected sections and having ends slidably fitting into end members of the same cross section. The central member is formed with ventilating apertures in front and rear walls thereof through which air can flow, and a filter medium is positioned in each section so that the air must flow therethrough. Filler strips are formed on and extend the length of the upper and lower edges of the central member and slidably fit in slots in the upper and lower edges of the end members so that said unit has continuous upper and lower edges in common upper and lower planes and extending the length thereof.

2 Claims, 4 Drawing Figures

U.S. Patent  Aug. 16, 1977  4,042,357
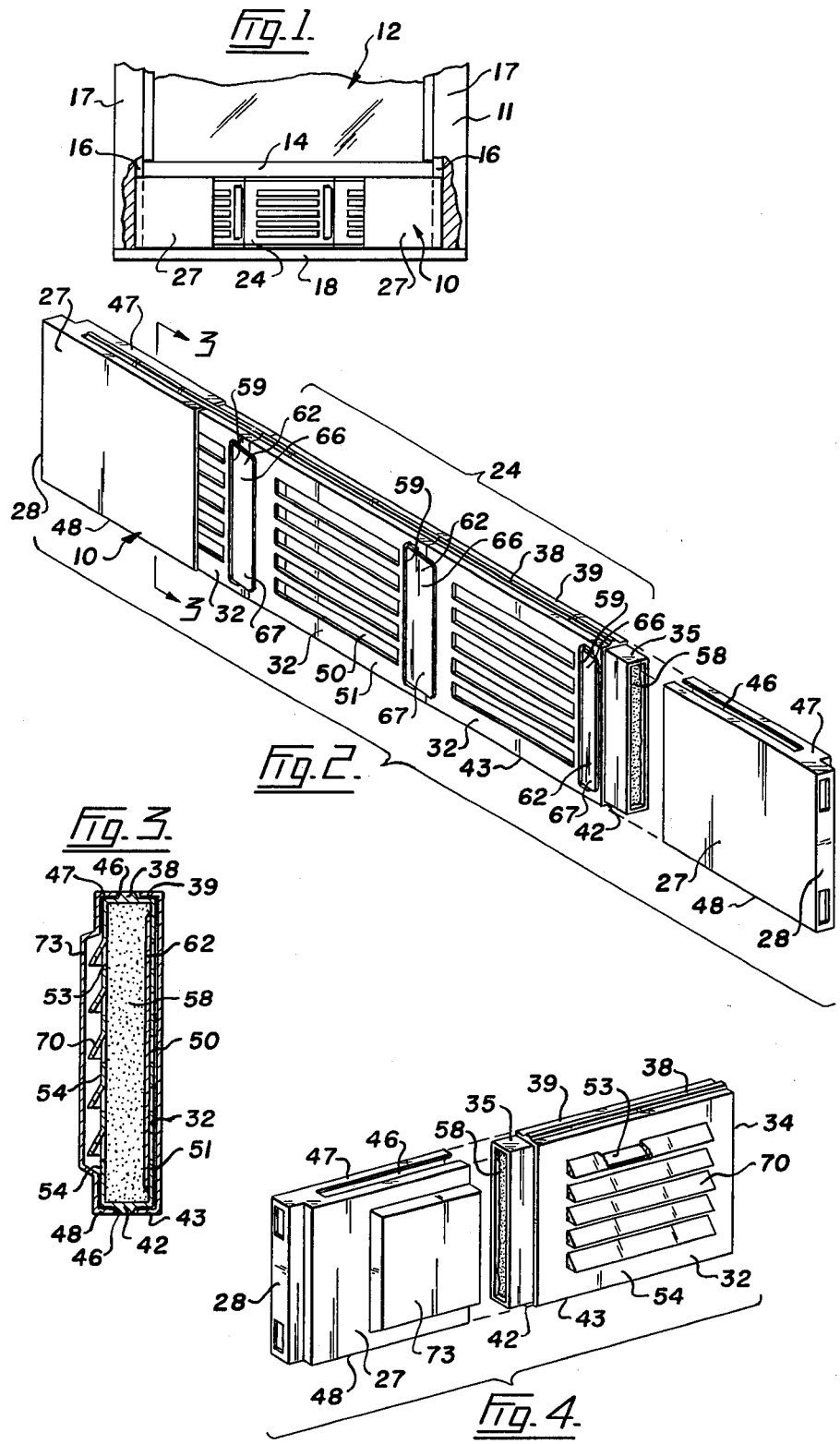

AIR FILTER UNIT FOR SLIDING SASH WINDOWS

This invention relates to a filter unit to be removably fitted in the frame of a sliding sash window between the sash and the bottom of the frame thereof. Although mainly used at the bottom of the window, this unit can be positioned between the sash and the top of the frame. However, for the sake of convenience the filter unit is described herein relative to the bottom of the window frame.

It is necessary to get fresh air into buildings, such as homes and office buildings, and particularly when the temperature is relatively high, but it is difficult to do this these days without admitting air entraining contaminants, such as particulate material, vapors and the like. There are screens on the market to be fitted into windows but these keep out only insects and relatively large particles, but permit fine particulate material and vapors to pass therethrough. It is becoming more important as industry increases and the use of internal combustion engines increases to filter air entering buildings, and particularly in large cities and manufacturing centres.

The present air filter unit is adapted to be fitted in the frame of a sliding sash window between the sash and the bottom or top of the window frame. This unit can be quickly and easily adjusted to fit windows of different widths, and it prevents any air from passing through the window opening excepting that which passes through the filter unit itself. The unit is such that it permits a good flow of air therethrough although all of the air must pass through a filter medium as it travels through the unit. The unit is designed so that no air can by-pass it either above or below the unit. An important advantage is that the unit includes means for closing off or reducing the flow of air so that it is not necessary to remove the unit from the window frame if it is desired to stop the flow of air therethrough.

A filter unit in accordance with the present invention comprises a central member of substantially rectangular cross section, two end members of substantially rectangular cross section, each of said end members being dimensioned to receive and slidably fit over an adjacent end of the central member; each of said end members having front and rear walls, and upper and lower edges, said upper and lower edges lying over upper and lower edges of the central member; ventilating apertures in front and rear walls of the central member through which air can flow through said central member, a filter medium in the central member through which said air must flow, and filler strips on and extending the length of said upper and lower edges of the central member, said upper and lower edges of the end members having slots therein to accommodate the filler strips of the central member, said filler strips and the upper and lower edges of the end members forming continuous upper and lower edges in common upper and lower planes extending the full length of the filter unit.

A preferred form of the filter unit according to this invention is illustrated in the accompanying drawings, in which FIG. 1 is an inside view of a window with an air filter unit positioned between the sash and the bottom of the frame thereof, FIG. 2 is an enlarged perspective view, partly exploded, of this filter unit, FIG. 3 is an enlarged vertical section taken on the line 3—3 of FIG. 2, and FIG. 4 is a perspective view of one end member and an end of one of the central sections of this unit.

Referring to the drawings, 10 is a filter unit according to this invention mounted in the frame 11 of a sliding sash type of window 12. A window sash 14 is slidably mounted in grooves 16 in the side members 17 of the frame, said frame having a sill 18 extending between the side members 17 at the bottom thereof.

When unit 10 is installed in the window, it rests on sill 18 with sash 14 bearing on its upper edge, and with its ends fitting in grooves 16 of the frame, as shown in FIG. 1.

The filter unit 10 consists of a central member 24 which is substantially rectangular in cross section and has its opposite ends slidably fitting within two identical end members 27 which also are substantially rectangular in cross section. The end members have closed outer ends 28 that fit within the grooves 16 of window frame 11.

Central member 24 is made up of one or more interfitting central sections 32, there being three of these identical sections shown in FIG. 2. Each central section 32 is hollow, and has an open end 34 at one end thereof and a reduced end 35 at its opposite end. The reduction of end 35 is such that it slidably fits within the open end 34 of an adjacent section 32. The open end 34 and reduced end 35 of adjacent central sections interfit to form a mortise joint, end 34 being the mortise and end 35 the tenon.

Each central section 32 has a filler strip or rib 38 on and extending the length of its upper edge 39 and another filler strip or rib 42 on and extending the length of its lower edge 43, see FIG. 3. As sections 32 slidably fit in end member 27, said sections are a little smaller than the latter, but the upper and lower projecting filler strips 38 and 42 make the central sections exactly the same height as the end sections. The end members 27 and 28 have slots 46 in their upper and lower edges 47 and 48 into which slidably fit the strips 38 and 42 of the central sections slidably fitting within these end members.

FIG. 2 illustrates three central sections 32 interconnected to form central member 24, the opposite ends of which slidably fit in end members 27 with their upper and lower filler strips slidably fitting in slots 46 of these end members. The outer surfaces of filler strips 38 and 42 combine with the upper and lower edges 47 and 48 of end members 27 to form upper and lower edges in common upper and lower planes extending the full length of unit 10.

Each central section 32 is formed with a plurality of longitudinally-extending apertures 50 in its inner wall 51, and with opposed longitudinally-extending apertures 53 in its outer wall 54, see FIGS. 3 and 4. These apertures permit air to flow through unit 10.

A filter pad 58 removably fits in and substantially fills each section 32. The section is formed with a vertical slot 59 in its inner face 51 which is wide enough to permit the filter pad 58 to be inserted into and withdrawn from the section. With this arrangement, it is a simple matter to change the filter pad when it has become clogged with dirt.

Each of the sections 32 has an air impervious sheet 62 which is large enough completely to cover the filter pad 58 and still have an end 66 projecting out through slot 59. When sheet 62 is positioned within its central section 32, it blocks off all of the apertures 50 in the inner wall 51 of the section so that air cannot travel through the section. When it is desired to partially or completely open the apertures 50, the projecting end 66 of sheet 62 is grasped and the required amount of the sheet withdrawn from the section. If the apertures are to be opened completely, sheet 62 can be withdrawn from the section.

If desired, louvers 70 may be provided on the front wall 54 of each central section 32, one over each of the apertures 53 therein. These louvers prevent moisture from passing through the apertures into the section. When these louvers 70 are provided, it is necessary to provide an enlargement 73 on the front wall of each end member 27, see FIGS. 3 and 4, so as to accommodate louvers 70 when the end sections 32 are fitted in the end members 27.

It is a very simple matter to install and use filter unit 10. The sash 14 of the window 12 is raised sufficiently to permit the unit to be placed on edge on sill 18 and expanded longitudinally so that its end members 27 fit within grooves 16 of the side members 17 of frame 11. The selected unit for the window has as many central sections 32 as are necessary to enable the unit completely to span the opening of the window and to fit in grooves 16. Then sash 14 is lowered until it rests on the upper edge of the filter unit. As the upper edges 47 of the end members 27 and the aligned ribs or filler strips 38 of the central section 24 are in a common plane and form the upper edge of unit 10, there is no place between the sash and the unit for the flow of air. Similarly, lower edges 48 and the ribs 42 being in a common plane constitute the lower edge of the unit and lie on sill 18 to prevent the flow of air over the sill. The air-impervious sheets 62 are left in the central sections 32 when it is desired to prevent the flow of air through unit 10. However, if these sheets are partially or completely withdrawn from the central sections, air will flow through apertures 53 and 50 and filter pad 58, which traps particulate material and vapors and so prevents these from going completely through the filter unit. The impervious sheet 62 may be reinserted into any one or more of sections 32 partially or completely to close the apertures thereof. Thus, the flow of air can be stopped without the necessity of removing the filter unit from the window. The aligned upper and lower edges of the unit prevent any air from flowing over or beneath said unit. If the need for the filter unit ends, it can be removed merely by raising sash 14 and collapsing the unit longitudinally sufficiently to enable it to be lifted out of the frame 11. If any one of the filter pads 58 becomes clogged, it can be withdrawn through slot 59 of its section 32 and cleaned and re-inserted into the section through the slot thereof, or it can be replaced by a new filter pad.

I claim:

1. A filter unit to be fitted in the frame of a sliding sash window between the sash and the bottom or the top of the frame, comprising a central member of substantially rectangular cross section, two end members of substantially rectangular cross section, each of said end members being dimensioned to receive and slidably fit over an adjacent end of the central member; each of said end members having front and rear walls and upper and lower edges, said upper and lower edges lying over upper and lower edges of the central member; ventilating apertures in front and rear walls of the central member through which air can flow through said central member, a filter pad in the central member through which said air must flow, said central member having a vertical slot in the rear wall thereof through which said filter pad can be inserted and removed from the central member, an air impervious sheet removably mounted in the central member extending longitudinally thereof and between the apertures of the front and rear walls selectively to prevent air from flowing therethrough, an end portion of said impervious sheet normally projecting through said vertical slot and by means of which the sheet can be grasped and partially or completely withdrawn through said vertical slot, and filler strips on and extending the length of said upper and lower edges of the central member and having outer surfaces facing away from the central member, said upper and lower edges of the end members having slots therein to accommodate the filler strips of the central member, the outer surfaces of said filler strips and the upper and lower edges of the end members being in upper and lower common planes and forming continuous upper and lower edges for said filter unit and extending the full length thereof whereby, when said unit is placed between a window sash and the frame thereof, there is no space between the sash and the frame of air to flow through.

2. An air filter unit as claimed in claim 1 in which said central member comprises a plurality of identical open-ended sections each having one end of smaller dimensions than the opposite end thereof so as slidably to fit in the opposite end of an adjacent section, each of said sections having a said slot in the rear wall thereof and having said ventillation apertures therein, there being a filter pad in each of said sections and removable through the slot of said each section and there being an impervious sheet in said each section with an end portion normally projecting through said slot thereof, said filler strips being on the upper and lower edges of said sections, and the filler strips of said sections being aligned in said common upper and lower planes and forming continuous strips extending from end to end of the central member.

* * * * *